Aug. 25, 1936.    J V. STROUGH    2,052,499
CENTER POST BATTERY COVER
Filed Nov. 13, 1935

J Val Strough
INVENTOR
BY Victor J. Evans & Co.
ATTORNEY

Patented Aug. 25, 1936

2,052,499

UNITED STATES PATENT OFFICE 2,052,499

CENTER POST BATTERY COVER

J. Val Strough, San Leandro, Calif.

Application November 13, 1935, Serial No. 49,628

3 Claims. (Cl. 136—135)

The invention relates to a battery and more especially to a center post battery cover.

The primary object of the invention is the provision of a cover for a battery which has a longitudinally arranged series of cells, wherein the positive and negative outlet posts are located in the center of the outside cell covers and in which battery post connecting cables of correct lengths are employed so as to eliminate the necessity of right and left hand batteries with the resultant saving to manufacturers, jobbers, merchants and customers.

Another object of the invention is the provision of a battery cover of this character, which is simple in construction, thoroughly reliable and efficient in its purpose, strong, durable and inexpensive to manufacture.

With these and other objects in view, the invention consists in the features of construction, combination and arrangement of parts as will be hereinafter more fully described, illustrated in the accompanying drawing, which discloses the preferred embodiment of the invention and pointed out in the claims hereunto appended.

In the accompanying drawing.

Similar reference characters indicate corresponding parts throughout the several views in the drawing.

Figure 1:
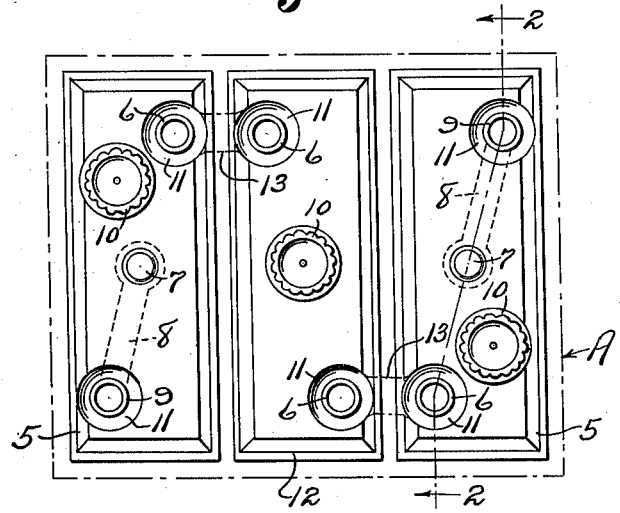
Figure 1 is a top plan view of a battery showing the cover with the positive and negative outlet posts connected in accordance with the invention.
Figure 2:
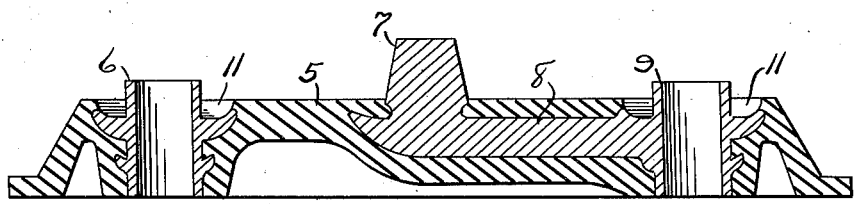
Figure 2 is an enlarged sectional view on the line 2—2 of Figure 1 looking in the direction of the arrows.

Referring to the drawing in detail, A designates generally an electric storage battery having central and end series of longitudinally arranged cells and which is designed for use in motor vehicles, boats or the like and associated with the cells of the said battery is a cover constituting the present invention and hereinafter fully described.

The cover for each series of cells comprises a body 5 made from conventional material and of the required size and shape accordingly to the make-up of the battery A. Within this body is a spur lead bushing 6 which is moulded within the body and the spur shape at the extreme top of the bushing strengthens the cover at said bushing and permits a high efficiency buried and burned connection with the cell plate bar and cell connector 13.

Arranged centrally of the cover or body 5 is a conventional lead center post 7 while embedded in the said body is an internal connector bar 8 which joins a spur bushing terminal 9 and the center post 7 connecting these to each other and all being formed in one piece and moulded integrally with the cover.

The cover or body 5 has as usual the conventional filler cap 10.

The bushing terminal 9 and the center post 7 with the bar 8 joining the same assures a high electrical efficiency between the plate bar and center terminal post.

It is preferable to have the top surface of the cover or body 5 formed with an annular recess 11 concentric to the bushing 6 and terminal 9 so as to permit the position of the connector 13, that is to say to be low in position within the body 5.

Each cell of the battery A has the cover and the cover before described in a three cell battery is arranged at opposite sides of the center cover 12 which is minus the center post 7 and the bar 8 and includes the bushings 6 on each end of the cell cover as before described.

What is claimed is:

1. In a battery, a cover plate, a center post arranged with the cover, a terminal bushing embedded in said cover and having a spur-shaped top end and a connector bar internally of the cover and joined with said post and bushing.

2. In a battery, a cover plate, a center post arranged with the cover, a terminal bushing embedded in said cover and having a spur-shaped top end and a connector bar internally of the cover and joined with said post and bushing, the cover at its top being formed with an annular recess concentric to the bushing.

3. In a battery, a cover plate, a center post arranged with the cover, a terminal bushing embedded in said cover and having a spur-shaped top end, a connector bar internally of the cover and joined with said post and bushing, the cover at its top being formed with an annular recess concentric to the bushing and a spur lead bushing moulded in the cover at that side of the same opposite the terminal bushing.

J. VAL STROUGH.